Jan. 27, 1953  F. A. KROHM  2,626,771
ACCESSORY BRACKET
Filed July 8, 1948
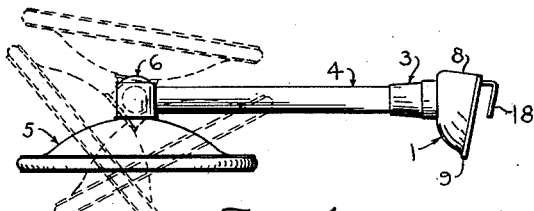
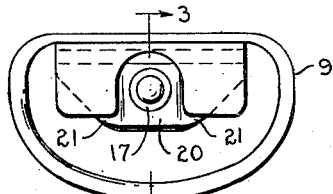
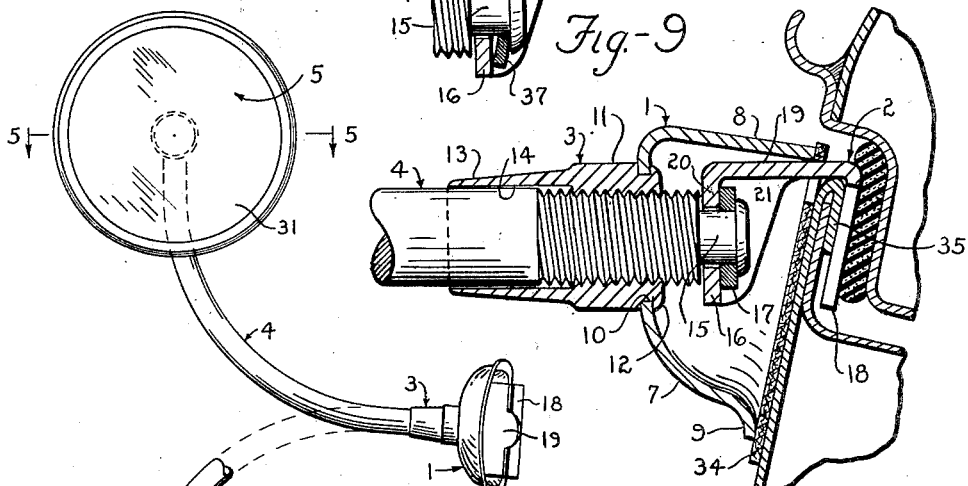
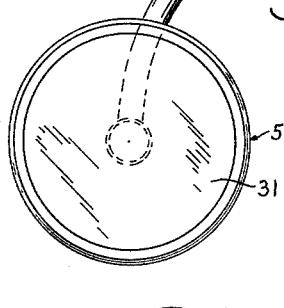
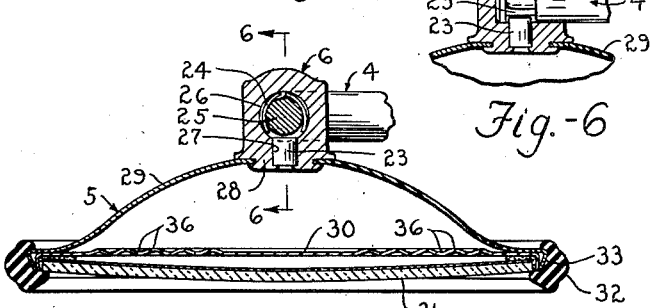
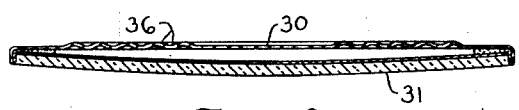
INVENTOR.
FRED A. KROHM
BY
Charles S. Penfold
ATTORNEY Patented Jan. 27, 1953

2,626,771

UNITED STATES PATENT OFFICE 2,626,771

ACCESSORY BRACKET

Fred A. Krohm, Gary, Ind., assignor to Productive Inventions, Inc., a corporation of Indiana Application July 8, 1948, Serial No. 37,541

1 Claim. (Cl. 248—226)

This invention relates generally to mirrors and other accessories adapted for use outside the body of a motor vehicle, and more particularly to a novel construction and arrangement designed to facilitate installation and use thereof.

An important object of the present invention is to provide an improved theftproof mirror device adapted to be secured to a vehicle wherein the mirror support serves to actuate the clamping means to secure the mirror to the vehicle.

A particular object of the invention is to provide an improved mirror device which may be firmly mounted on a vehicle body quickly and conveniently and without the use of tools.

Another object of the invention is to provide improved means for adjusting and maintaining the mirror in any desired angular position with respect to the vehicle body.

Another object of the invention is to provide a mirror device comprised of few parts which are economical to manufacture and assemble, and wherein certain of such parts are attached by a single means.

A further object of the invention is to provide, in a clamp-on-door accessory device, added resilience, to permit a wider range of clamping screw movement at any point within which the mirror may be adequately secured.

An additional object of the invention is to provide, in a clamp-on-door accessory device, greater capacity of the clamping jaw to receive thicker door portions.

Other objects and advantages of the invention will appear after the description hereinafter set forth is considered in conjunction with the drawing annexed hereto.

In the drawing:

Figure 1 is a view of the mirror supporting device illustrating the universal adjustability of the mirror about its axis of rotation;

Figure 2 is an end view of the clamp or bracket of the assembly shown in Figure 1;

Figure 3 is a sectional view taken through a portion of the assembly, substantially on line 3—3 of Figure 2;

Figure 4 is a view of the supporting device illustrating the universal adjustability of the mirror supporting member about its axis of rotation;

Figure 5 is a sectional view of the mirror and a fitting therefor, taken substantially on line 5—5 of Figure 4;

Figure 6 is a sectional view of the fitting taken substantially on line 6—6 of Figure 5;

Figure 7 is a perspective view illustrating a spring friction member shown in Figures 5 and 6;

Figure 8 is a sectional view showing the manner of hermetically sealing the lens of the mirror assembly; and Figure 9 is a sectional view of a modified assembly having resilient means associated therewith whereby to permit greater adjustability between the clamping assembly and the mounting upon which it is adapted to be supported.

The illustrative embodiment of the present invention shown in the accompanying drawing includes, among other things, a clamping assembly comprising a front shell 1; an attaching member 2 cooperable with the shell to clamp a mounting, such as a door, therebetween; a sleeve 3 anchored to the shell; an accessory supporting arm 4 rotatably carried by the sleeve; and a mirror 5 rotatably secured to the arm by a fitting 6.

The front shell 1 may be fashioned as desired but is preferably made generally oblong in shape and includes an outer curved wall 7, a substantially planar side wall 8, and a flaring peripheral bearing flange 9. The central portion of the outer wall is preferably made flat and is provided with a circular aperture 10, within which the inner end 11 of the sleeve 3 is firmly secured by upsetting a reduced axial extension of the sleeve against the inner surface of such wall as indicated at 12. The plane of the side wall 8 is preferably arranged substantially at right angles to the plane formed by the bearing flange 9 and the central portion of the front wall at an acute angle with reference to such side wall so as to impart rigidity to the construction, and at the same time locate the longitudinal axis of the sleeve in a position whereby the arm will be supported for convenient manipulation by the operator or occupant of the vehicle. The sleeve is internally threaded at the end 11 for cooperation with exterior threads on the inner extremity of the arm, and includes a skirt or ferrule portion 13 which is provided with a smooth cylindrical bore 14 of a diameter slightly greater than that of the arm. This ferrule portion serves to prevent undue lateral displacement of the arm as well as improve the general overall appearance of the assembly.

The arm may be designed and constructed as desired but is preferably made solid in cross section and formed into an arcuate shape with straight extremities, the latter of which are arranged substantially at right angles with respect to one another. The inner extremity of the arm is provided with an axial extension 15 of a reduced diameter which projects through an aperture formed in the leg 16 of the attaching member. A retaining washer 17 is carried by the extension and such extension is upset against the washer for permanently and rotatably connecting the attaching member and arm.

The attaching member may be constructed as desired but is preferably formed into channel shape from relatively thick sheet metal stock and includes the leg 16 above referred to, a jaw 18, and a bridge 19. As clearly exemplified in Figure 3 of the drawing, the major part of the attaching member is disposed substantially entirely within the confines of the shell with the jaw 18 arranged so that it may be hooked over a lip or other projection formed on a vehicle door or other support. More specifically in this respect, the jaw 18 and the peripheral bearing flange 9 are constructed and arranged to clamp the lip or projection therebetween through the simple expedient of rotating the arm.

It will be noted that the jaw 18 is preferably located at an acute angle with reference to the bridge portion 19, and substantially parallel with the bearing flange 9 so that when the clamp is applied, the attaching member will have a tendency to move in a direction to seat itself and thereby obtain a more secure connection between the clamp and door. More particularly in this respect, the area of engagement between this jaw and the rear side of the lip is preferably located substantially centrally with respect to the bearing flange 9 of the shell, and more or less in coaxial alignment with the inner extremity of the arm so as to locate and properly distribute the pressure where most desired to promote the clamping action.

If found desirable a gasket 34 may be secured to the clamping assembly in such a way that the bearing flange 9 will not damage the exterior finished surface of the car door.

The parts are preferably so constructed and arranged that the bridge portion 19 of the attaching member may cooperate with the marginal edge of the side wall 8 of the shell whereby to assist in preventing undue tilting or distortion of such member when clamping pressure is applied by rotating the arm. The leg 16 of the attaching member is preferably formed to provide a substantially flat central portion 20 and inclined portions 21, all of which join with the bridge to lend additional rigidity to the member to counteract distortion thereof.

The outer extremity of the arm, as shown in Figures 5 and 6, is formed with a transverse retaining groove 22 adapted to cooperate with a retaining stud 23 for rotatably securing the arm to the fitting 6. One or more bent leaf resilient springs 24 as illustrated in Figures 5, 6 and 7 are adapted to be assembled in the retaining groove to forcibly engage the neck 25, formed thereby, and also engage the inner cylindrical surface of a bore 26 in the fitting whereby to frictionally resist relative rotational movement between the arm and fitting. More specifically in this respect, the springs 24 are placed under a high state of compression or distortion as considerable force is required to insert the springs as the parts are being assembled. After assembly the springs exert radial pressures against the wall of the bore 26 and the neck 25 of the arm, and since the extremities of the springs intimately engage and tend to more or less bite into the wall of the opening, they are substantially held in stationary positions whereby to permit such neck portion to rotate against the interior bearing surfaces of such springs.

The retaining stud 23 is adapted to be assembled in an axial opening 27 of the fitting with an end thereof seated in the retaining groove and the inner end of the fitting is provided with a protuberance 28 which is upset to lock the stud in place and at the same time secure the shell 29 of the mirror to the fitting. The pressure required to assemble the parts and compress the springs is such that for all practical purposes it is substantially impossible to separate the parts once they are assembled. In other words, an operative rotative frictional joint is obtained between the fitting and the arm without the necessity of using the retaining stud 23.

As illustrated in Figure 5, the mirror 5 may comprise the cup-shaped shell 29, a metal backing 30, a reflector lens 31, and a ring member 32. The shell is provided with a circular center aperture within which the protuberance 28 of the fitting is permanently secured.

As illustrated in Figure 8, the backing 30 is hermetically sealed to the lens 31 by a suitable pliable cementitious material or compound arranged between adjacent peripheral portions, all of which is disclosed in the U. S. Letters Patent No. 2,187,582, issued on January 16, 1940.

By reason of the curved form of the lens and the substantially flat character of the backing an enclosed hermetically sealed space or pocket is provided therebetween. To compensate for changes of pressure of fluid enclosed in such space due to changes in ambient temperature or other causes, the backing is provided with a plurality of alternating substantially parallel annular ribs or corrugations 36 to increase its flexibility and ability to absorb such changes in pressure and to keep inviolate the hermetic seal so as to permanently protect the silvered surface or other reflective medium of the lens.

The ring member 32, preferably made of plastic or slightly yieldable material, is adapted to be flexed to embrace and secure within its annular groove 33 in assembled operating relationship the cupped rear shell 29, backing 30, and lens 31.

It will be apparent from the foregoing description and drawing that the present invention provides a novel construction and arrangement whereby the mirror 5 may be moved about its axis of rotation centered in the arm by reason of the arcuate form of such arm, which allows clearance for the complete revolution of the mirror; and also that the mirror may be maintained in any manually selected position of rotation by reason of the frictional resistance against relative rotation provided by the reactive pressure of springs 24 against the arm and fitting 6.

It will also be manifest that the mirror is symmetrically secured to and universally rotatable around the arm which minimizes the difference in air pressures against the exterior surfaces of the mirror, particularly when the vehicle to which the mirror device is attached is in motion, and accordingly minimizes any pressure of natural forces to cause rotation of the mirror from its manually selected position.

It will be noted that the arm is threaded and universally rotatable in sleeve 3 to any manually selected position of radial angularity, without substantially affecting the clamping attachment pressure applied to the body of the vehicle or the rigidity of the mirror device extending therefrom due to the use of fine screw threads and resilience offered by the gasket 34.

The permissible rotation of the supporting arm in the sleeve 3 in combination with the permissible rotation of the mirror about the arm provides a universal selection of position of attachment of the mirror device upon the vehicle body and a universal selection of the field of vision to be viewed within the limits prescribed by the construction of the body of the vehicle.

To attach the mirror device in operating relationship to the body of a vehicle, for example on the lip or flange 35 of a door, the jaw 18 is manually positioned between such lip and the jamb with the bridge 19 extending over the edge of the lip and the gasket arranged adjacent to the outer surface of the door. Holding the mirror device in this position manually, the arm is rotated relative to sleeve 3 using the arm as a lever or crank, and by reason of the cooperating screw threads on the arm and sleeve, the jaw 18 may be drawn outwardly toward the front shell 1 until the lip is clamped with requisite pressure therebetween. The arm may thereupon be moved to manually adjust the mirror to the selected horizontal position and the mirror may be manually rotated relative to the arm to adjust the mirror to the selected field of vision.

Arm 4 is rotated in sleeve 3 to affect clamping of the device securely in position. The normal position of arm 4 is determined by the position of the mirror with relation to the car body and the driver's eye. In the construction shown in Figure 3, the position of arm 4 at the time the clamping action is fully affected may be not the position desired for positioning the mirror correctly. The travel of the arm in rotation after the clamp is adequately secured and before the maximum clamping pressure attainable without undesirable distortion of parts may be so limited as to seriously interfere with the correct positioning of the mirror for operation of the device.

It is therefore desirable, as exemplified in Figure 9 of the drawing, to provide within the clamping construction a resilient member 37 receiving and transmitting the pressure between the arm 4 and the jaw 18, to permit adequate travel of the arm in clamping rotation so that the mirror may be conveniently positioned for effective operation while the clamping pressure remains adequate to secure the device effectively to its mounting. This member may be located in any position to accomplish the intended result, but is preferably carried by the arm and interposed between the upset end thereof and the attaching member.

It will be noted that the length of the threaded portion of arm 4 determines the distance jaw 18 may be projected beyond the plane of the base of the bearing flange 9. Thus, the length of said threaded portion may be made adequate to permit substantially the entire space between the inner face of jaw 18 and adjacent portions of leg 16 to be exposed for engaging the flange of the car door. Since these flanges vary greatly in thickness, this advantage adds materially to the utility of the device.

Modifications and changes in detail will of course occur to those skilled in the art without departing from the spirit and scope of my invention, but having set forth the objects and nature thereof, and having shown and described constructions embodying the principles of my invention, what I claim as new and useful and of my own invention and desire to secure by Letters Patent is:

A clamp assembly for supporting an accessory on a support comprising a shell-like jaw member having marginal edges for cooperation with the outer side of a support and an outer portion spaced outwardly from said marginal edges, a second jaw member having an inner portion for cooperation with the inner side of a support and an outer portion spaced from said inner portion, an internally threaded sleeve immovably secured to the outer portion of one of the jaw members, an accessory supporting shaft rotatably mounted in said sleeve having threads engaging the threads on the sleeve, resilient means, said shaft having a reduced portion extending through the resilient means and also having an abutment, the arrangement being such that when the jaw members are operated by rotating the shaft, the resilient means will be forced against the abutment to distort the resilient means so that the inner portion of the second jaw and the marginal edges of the shell-like jaw will resiliently clamp a support therebetween.

FRED A. KROHM.

REFERENCES CITED

The following references are of record in the file of this patent:

UNITED STATES PATENTS

| Number | Name | Date |
| --- | --- | --- |
| 1,383,994 | Olson | July 5, 1921 |
| 2,191,085 | Rosen | Feb. 20, 1940 |
| 2,238,877 | Anderson | Apr. 22, 1941 |
| 2,248,833 | Thibault et al. | July 8, 1941 |
| 2,322,431 | Fischer | June 22, 1943 |
| 2,361,764 | Golden | Oct. 31, 1944 |
| 2,457,639 | Brooks | Dec. 28, 1948 |